United States Patent [19]

Usuta et al.

[11] Patent Number: 5,158,335
[45] Date of Patent: Oct. 27, 1992

[54] WEATHERSTRIP STRUCTURE FOR AUTOMOTIVE VEHICLE

[75] Inventors: Takahiro Usuta; Yuji Sakamaki; Tomio Sugawara; Hiroshi Urume, all of Chiba, Japan

[73] Assignee: Kinugawa Rubber Industrial Co., Ltd., Japan

[21] Appl. No.: 635,224

[22] Filed: Dec. 28, 1990

[30] Foreign Application Priority Data

Dec. 28, 1989 [JP] Japan .................... 1-344790

[51] Int. Cl.$^5$ .................... B60J 7/18; E06B 7/22
[52] U.S. Cl. .................... 49/476; 296/218; 296/146 F
[58] Field of Search ........... 296/216, 218, 222, 223, 296/221, 201, 202, 155; 49/476, 482; 52/208

[56] References Cited

U.S. PATENT DOCUMENTS

| | | | |
|---|---|---|---|
| 4,509,791 | 4/1985 | Beinert et al. | 296/216 |
| 4,765,673 | 8/1988 | Frabotta et al. | |
| 4,892,351 | 1/1990 | Ono et al. | 296/216 |

FOREIGN PATENT DOCUMENTS 88019362 12/1987 Netherlands .

Primary Examiner—Robert R. Song
Attorney, Agent, or Firm—Ronald P. Kananen

[57] ABSTRACT

A weatherstrip structure for an automotive vehicle includes a main body and a seal lip. The main body extends between first and second automotive components and retains the first automotive component at its one side. The seal lip extends from the main body between the main body and the second automotive component so as to define a space between the main body and the seal lip. The seal lip is elastically pressed onto the second automotive component so as to seal between the first and second automotive components. At least one elastic member is fixedly provided in the space. The rib member extends between the main body and the seal lip in a direction which is inclined relative to a direction along which a compressive force is applied to the rib member via the seal lip from the second automotive component.

8 Claims, 5 Drawing Sheets (BACKGROUND ART)

5,158,335

WEATHERSTRIP STRUCTURE FOR AUTOMOTIVE VEHICLE

BACKGROUND OF THE INVENTION

1. Field of the Invention the present invention relates generally to a weatherstrip for an automotive vehicle. More specifically, the present invention relates to a weatherstrip structure for an automotive vehicle which can prevent an excessive reaction force from being applied to a corresponding automotive components while ensuring a highly reliable sealing effect therebetween.

2. Description of the Background Art

A weatherstrip for sealing a space between, for example, an opening edge of a vehicular panel and a hatch roof has been proposed as shown in FIGS. 1 to 8.

In FIG. 1, an automotive roof panel 1 has a pair of openings at which a pair of hatch roofs 3 are respectively fitted through corresponding weatherstrips so as to enhance natural lighting into a vehicle body. FIG. 2 shows an enlarged perspective view showing a portion by a dotted line II in FIG. 1. The hatch roof 3 includes a plastic panel section 3a and a translucent glass section 3b. As shown in FIGS. 3 and 4 which are cross-sections taken along lines III—III and IV—IV in FIG. 2, respectively, the roof panel 1 has a stepped section at a peripheral edge of the opening. The stepped section includes an upright wall 1a, a bottom wall 1b and an upright flange 1c. A weatherstrip 5 includes a welt 5a made of a solid rubber and a hollow sponge rubber sealing member 5b fixed onto the welt 5a. The welt 5 is firmly fitted onto the upright flange 1c by tightly holding the upright flange 1c between a plurality of grasping lips.

A weatherstrip 7 is further provided between a peripheral edge of the hatch roof and the upright wall 1a of the roof panel 1. Specifically, the weatherstrip 7 has a main body 7a, a seal lip 7b which is continuous with the main body 7a and is elastically pressed onto an upper surface of the plastic section 3a or the translucent glass section 3b of the hatch roof 3 at its peripheral edge so as to tightly hold same in cooperation with the main body 7a, and a seal lip 7c which is continuous with the main body 7a and is provided at a side opposite to the seal lip 7b with respect to the main body 7a. The seal lip 7c has a substantially C-shaped cross-section and is elastically pressed against the upright wall 1a of the roof panel 1 when the hatch roof 3 is mounted on the roof panel 1. As shown in FIG. 3, a reinforcing member 9 is fixedly inserted at a predetermined portion of the main body 7a.

A shown in FIG. 5, a space 11 is formed between the main body 7a and the seal lip 7c. The space 11 is open downward when the hatch roof 3 is mounted onto the roof panel 1, and includes therein a plurality of ribs 13. Each rib 13 is in the form of a rubber plate, and as shown in FIG. 6, each rib 13 is integrally formed with the main body 7a and the seal lip 7c and extends therebetween in a direction indicated by a line X. The line X extends in perpendicular to a line Y extending in a longitudinal direction of the main body 7a and indicates a direction along which a compressive force is applied to the rib 13 via the seal lip 7c from the upright wall 1a of the roof panel 1. Accordingly, each rib 13 extends between the main body 7a and the seal lip 7c in the direction of the compressive force applied to the rib 13 via the seal lip 7c from the upright wall 1a of the roof panel 1.

As appreciated and as seen from FIG. 7, by providing the ribs 13 between the main body 7a and the seal lip 7c, a reaction force of the seal lip 7c against the upright wall 1a of the roof panel 1 is ensured so as to provide a highly reliable sealing effect or water-tightness between the seal lip 7c and the upright wall 1a of the roof panel 1, i.e. between the inside and the outside of the vehicle body. Further, deformation of the seal lip 7c as indicated by imaginary lines in FIG. 8 is effectively prevented by means of the rigidity of the ribs 13.

In the foregoing background art, however, when the compressive force applied to the ribs 13 via the seal lip 7c from the upright wall 1a of the roof panel 1 is set large so as to ensure the highly reliable sealing effect between the seal lip 7c and the upright wall 1a, since each of the ribs 13 is arranged extending in the direction perpendicular to the longitudinal direction of the main body 7a or in the direction of the compressive force applied from the upright wall 1a, the reaction force of the ribs 13 becomes excessively large to make it laborious to mount or dismount the hatch roof 3 from or onto the roof panel 1.

SUMMARY OF THE INVENTION

Accordingly, it is an object of the present invention to provide a weatherstrip structure for an automotive vehicle, that can eliminate the above-noted defects inherent in the background art.

It is another object of the present invention to provide a weatherstrip structure for an automotive vehicle, that can prevent an excessive reaction force from applying to a corresponding automotive component, while ensuring a highly reliable sealing effect therebetween.

To accomplish the above-mentioned and other objects, according to one aspect of the present invention, a weatherstrip structure for an automotive vehicle comprises a main body extending between first and second automotive components and having means for retaining the first automotive component.

A seal lip is provided extending from the main body between the main body and the second automotive component so as to define a space between the main body and the seal lip. The seal lip is elastically pressed onto the second automotive component so as to seal between the first and second automotive components.

At least one elastic rib member is fixedly provided in the space. The rib member extends between the main body and the seal lip in a direction which is inclined relative to a direction along which a compressive force is applied to the rib member via the seal lip from the second automotive component.

According to another aspect of the present invention, a weatherstrip structure for an automotive vehicle comprises a main body extending between first and second automotive components and having means for retaining the first automotive component. The main body has a longitudinal axis which extends in parallel to an opposing surface of the second automotive component.

A seal lip is provided extended from the main body between the main body and the opposing surface of the second automotive component so as to define a space between the main body and the seal lip. The seal lip is elastically pressed onto the opposing surface of the second automotive component so as to seal between the first and second automotive components.

At least one elastic rib member is fixedly provided in the space and extends between the main body and the first lip in a direction which is inclined to the longitudinal axis of the main body.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Figure 9:
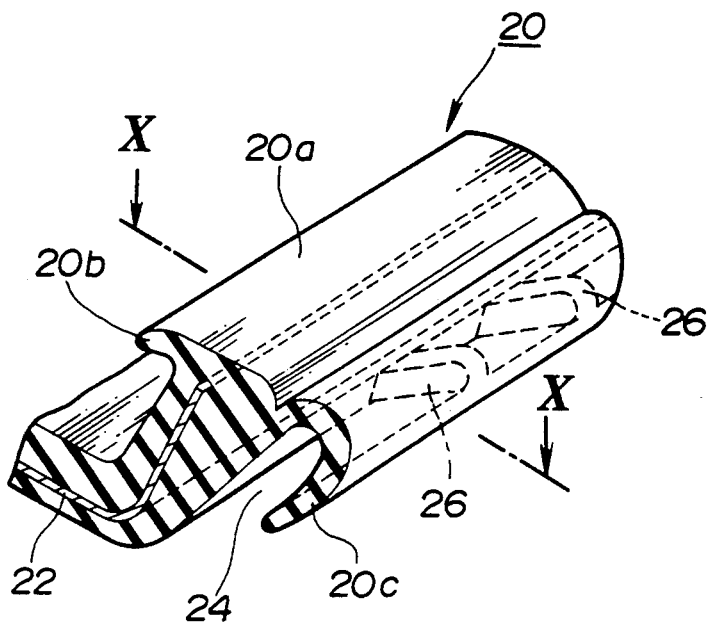
FIG. 9 is a partial perspective view with a cross-section, showing a weatherstrip structure according to a preferred embodiment of the present invention.
Figure 10:
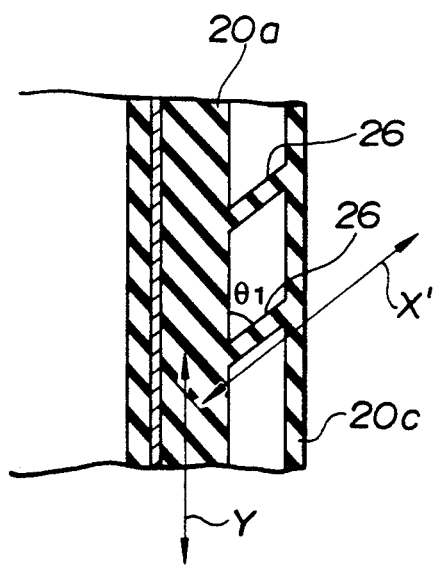
FIG. 10 is a cross-sectional view taken along a line X—X in FIG. 9.
Figure 11:
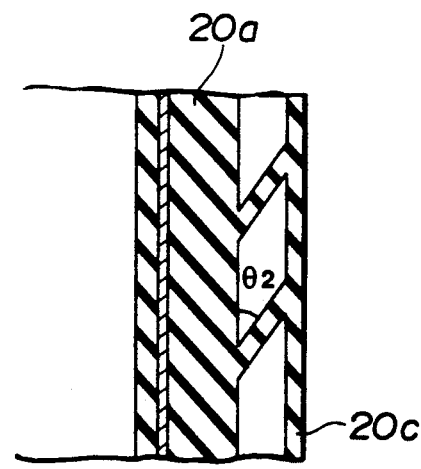
FIG. 11 is a cross-sectional view corresponding to FIG. 10, showing deformation of ribs when a compressive force is applied to the ribs.

Referring now to the drawings, FIGS. 9 to 11 show a preferred embodiment of a weatherstrip structure for an automotive vehicle according to the present invention.

Figure 3:
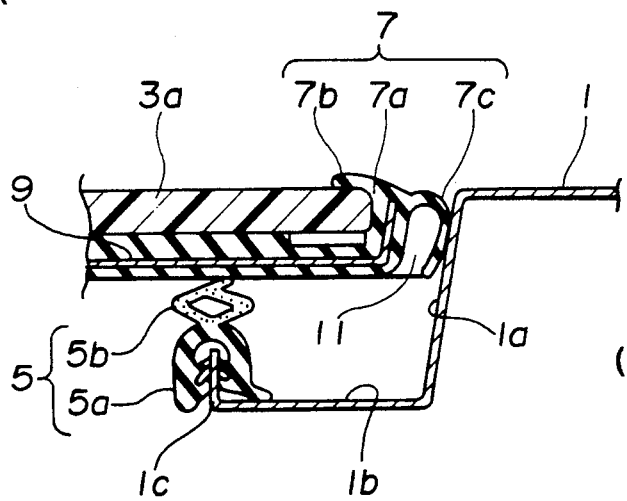
FIG. 3 is a cross-sectional view taken along a line III—III in FIG. 2.
Figure 4:
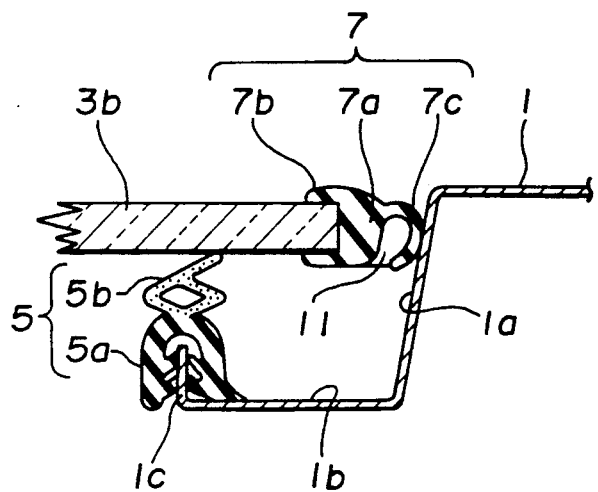
FIG. 4 is a cross-sectional view taken along a line IV—IV in FIG. 2.
Figure 5:
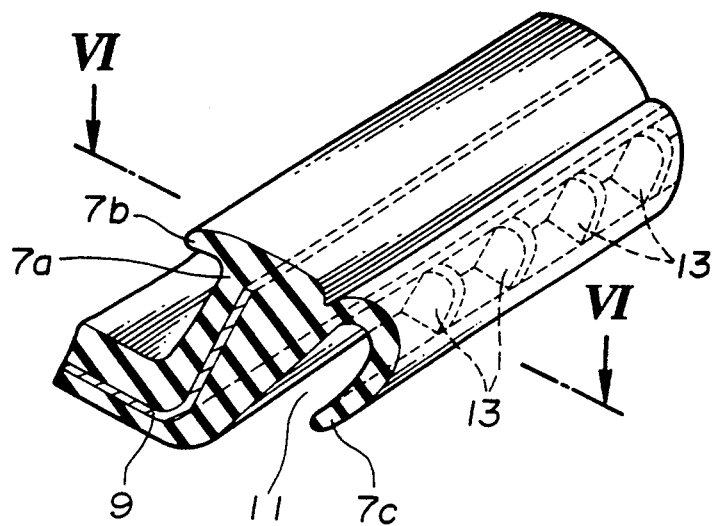
FIG. 5 is a partial perspective view with a cross-section, showing a weatherstrip structure according to the background art.
Figure 6:
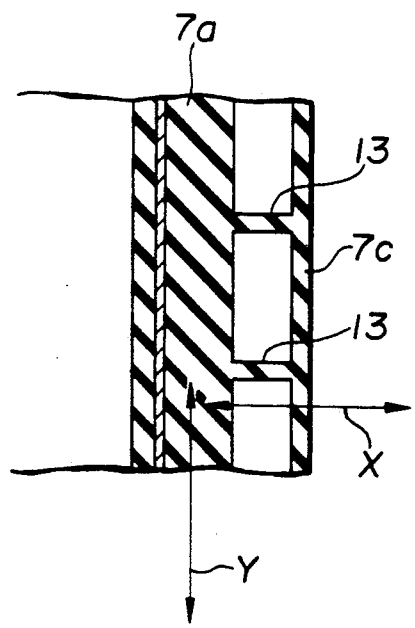
FIG. 6 is a cross-sectional view taken along a line VI—VI in FIG. 5.
Figure 7:
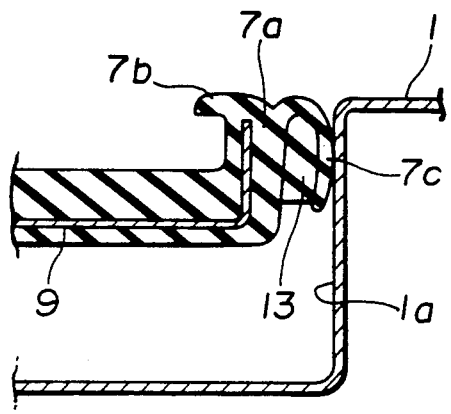
FIG. 7 is a cross-sectional view showing the weatherstrip structure of the background art for explaining the operation thereof.

It is to be appreciated that since the preferred embodiment differs from the background art only in structure of a weatherstrip itself, i.e. the roof panel 1 and the hatch roof 3 referred to in the background art can be used in the preferred embodiment and the weatherstrip according to the preferred embodiment is applied between the hatch roof 3 and the side wall 1a of the roof panel 1 in the manner as shown in FIGS. 3 and 4, a detailed explanation will be made hereinbelow only for the weatherstrip itself so as to avoid a redundant disclosure. Further, the same reference numerals will be used hereinbelow for the associated members as in the background art.

Figure 1:
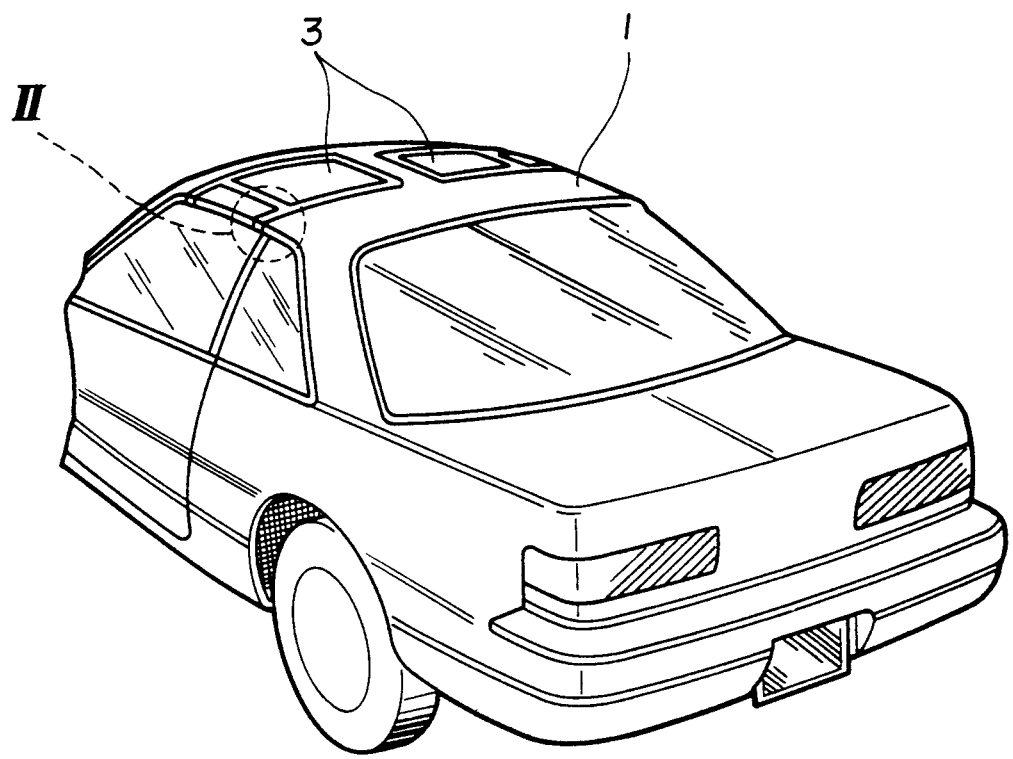
FIG. 1 is a perspective view showing an external appearance of an automotive vehicle having hatch roofs at a roof panel.
Figure 2:
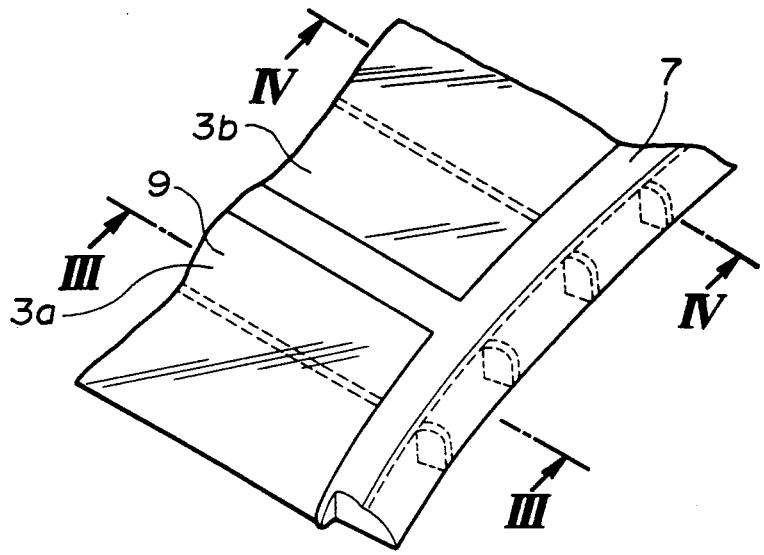
FIG. 2 is an enlarged perspective view showing a portion encircled by a dotted line II in FIG. 1, according to a background art.

In FIG. 9, weatherstrip 20 includes a main body 20a made of, for example, a solid rubber, a seal lip 20b which is continuous with the main body 20a and is elastically pressed onto the upper surface of the plastic panel section 3a or the translucent glass section 3b of the hatch roof 3 at its peripheral edge so as to tightly hold same in cooperation with the main body 20a, and a seal lip 20c which is continuous with the main body 20a and is provided at a side opposite to the seal lip 20b with respect to the main body 20a. The seal lip 20c has a substantially C-shaped cross-section and is elastically pressed against the upright wall 1a of the roof panel 1 when the hatch roof 3 is mounted on the roof panel 1. A reinforcing member 22 is fixedly inserted at a predetermined portion of the main body 20a in the same manner as shown in FIGS. 2 and 3.

A space 24 is formed between the main body 20a and the seal lip 20c. The space 24 is open downward when the hatch roof 3 is mounted onto the roof panel 1, and includes therein a plurality of ribs 26. Each rib 26 is in the form of a rubber plate, and as shown in FIG. 10, each rib 26 is fixedly provided between the main body 20a and the seal lip 20c. Specifically, each rib 26 has substantially a rectangular parallelepiped shape with a curved end fixed to the seal lip 20c. The rib 26 has another end opposite to the curved end which is fixed to the main body 20a. A center longitudinal axis of the rib 26 passing through the above-noted both ends extends in a direction indicated by a line X'. The line X' is set inclined to a line Y with an angle $\theta_1$, while, the line Y extends in a longitudinal direction of the elongate main body 20a. In other words, each rib 26 extends between the main body 20a and the seal lip 20c in the direction X' which is inclined relative to a direction along which a compressive force is applied to the rib 26 via the seal lip 20c from the upright wall 1a of the roof panel 1. Accordingly, as shown in FIG. 11, when the compressive force is applied to the ribs 26 via the seal lip 20c from the upright wall 1a of the roof panel 1, i.e. the hatch roof 3 is mounted onto the roof panel 1, each rib 26 is deformed so as to make less the angle $\theta_1$, i.e. to change the angle $\theta_1$ to an angle $\theta_2$ which is less than the angle $\theta_1$. As a result, a reaction force of the seal lip 20c against the upright wall 1a of the roof panel 1 becomes less than that provided by the rib arrangement of the background art where each rib is arranged extending in the direction of the compressive force applied to the rib from the upright wall 1a of the roof panel 1, but is still large enough to effectively seal between the seal lip 20c and the upright wall 1a of the roof panel 1.

In this preferred embodiment, each rib 26 is free from contact with either of the main body 20a or the seal lip 20c at its portions other than at the curved end fixed to the seal lip 20c and at the opposite end fixed to the main body 20a so as to ensure the above-noted deformation shown in FIG. 11. The ribs 26 may be formed integral with the main body 20a and the seal lips 20b and 20c.

Figure 8:
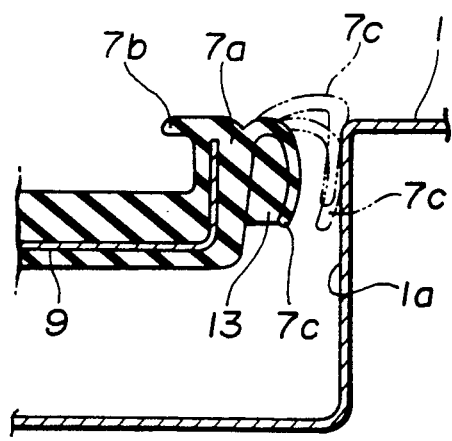
FIG. 8 is a cross-sectional view showing the weatherstrip structure of the background art for explaining operation thereof.

It is to be appreciated that the deformation of the seal lip 20c which is otherwise generated as shown in FIG. 8 when no rib is provided, is effectively prevented by means of rigidity of the ribs 26.

As appreciated from the foregoing description of the preferred embodiment, the excessive reaction force of the seal lip 20c is effectively prevented so as to make it easy to mount or dismount the hatch roof 3 onto or from the roof panel 1, while the reaction force of the seal lip 20c against the upright wall 1a of the roof panel 1 is still set large enough to provide a highly reliable sealing effect therebetween.

It is to be understood that this invention is not to be limited to the embodiment described above, and that various changes and modifications may be made without departing from the spirit and scope of the invention as defined in the appended claims. For example, though a plurality of the ribs are provided in the forgoing preferred embodiment, at least one rib 26 may be provided between the main body 20a and the seal lip 20c. Further, though the foregoing preferred embodiment relates to the weatherstrip for sealing between the hatch roof and the roof panel, the present invention is also applicable to a weatherstrip for sealing between other automotive components.

We claim:

1. A weatherstrip structure for an automotive vehicle, comprising:
   a main body arranged between first and second automotive components, said main body having means for retaining said first automotive component, said main body having a side which extends along a first line extending in parallel to an opposing surface of said second automotive component;
   a seal lip extending from said main body between the main body and said opposing surface of the second automotive component so as to define a space between said main body and said seal lip, said seal lip being elastically pressed onto said opposing surface of the second automotive component so as to seal between said first and second automotive components;
   at least one elastic rib member fixedly provided in said space, said rib member extending between said main body and said seal lip along a second line, which second line is inclined relative to said first line in a plane which includes said first and second lines.

2. The weatherstrip structure as set forth in claim 1, wherein said seal lip has a curved cross-section, and wherein said rib member has substantially a rectangular parallelepiped shape with a curved end fixed to said seal lip, said rib member further fixed to said main body at its longitudinal end opposite to said curved end.

3. The weatherstrip structure as set forth in claim 2, wherein said rib member is free from contact with either of the main body or the seal lip at its portions other than at said curved and longitudinal ends.

4. The weatherstrip structure as set forth in claim 2, wherein a longitudinal center axis of said rib member passing through said curved and longitudinal ends extends along said second line.

5. The weatherstrip structure as set forth in claim 1, wherein said rib member has an elongate shape and is fixed to said main body and said seal lip at its respective longitudinal ends.

6. The weatherstrip structure as set forth in claim 5, wherein a longitudinal axis of said rib member passing through said longitudinal ends extends along said second line.

7. The weatherstrip structure as set forth in claim 1, wherein said rib member is fixed to the main body at its one end and to the seal lip at its other end opposite to said one end.

8. The weatherstrip structure as set forth in claim 7, wherein said rib member is free from contact with either of the main body or the seal lip at its portions other than at said one and other ends.

* * * * *